United States Patent [19]
Sims, Jr.

[11] 4,337,908
[45] Jul. 6, 1982

[54] CARTRIDGE-LOADING APPARATUS FOR TAPE RECORDER DRIVES

[75] Inventor: Dewey M. Sims, Jr., Wayne, Mich.

[73] Assignee: Northern Telecom Systems Corporation, Ann Arbor, Mich.

[21] Appl. No.: 149,768

[22] Filed: May 14, 1980

[51] Int. Cl.³ .................... G03B 1/04; G11B 15/32
[52] U.S. Cl. .............................. 242/198; 242/200
[58] Field of Search .................. 242/192, 198, 200; 360/96, 132, 137

[56] References Cited
U.S. PATENT DOCUMENTS

| | | | |
|---|---|---|---|
| 3,924,823 | 12/1975 | Cohen et al. | 242/198 |
| 4,065,800 | 12/1977 | Wilson et al. | 360/137 |
| 4,085,906 | 4/1978 | Dahl et al. | 242/192 |

*Primary Examiner*—Leonard D. Christian
*Attorney, Agent, or Firm*—Price, Heneveld, Huizenga & Cooper

[57] ABSTRACT

A cassette or cartridge-loading tape transport is disclosed, for use in magnetic recorders and the like, especially data recorders. The device includes tracks for slidably receiving a cassette or cartridge. A plate is slidably supported below the tracks and a drive motor is mounted on the plate. A constant-force spring biases the plate to a forward position. A plurality of lever arms supporting rollers are pivotally mounted adjacent the plate. Each lever arm includes a cam surface cooperating with a cam surface on the plate so that the rollers on the arms are moved from a lowered, inoperative position to a raised position engaging, locating and locking the cassette or cartridge within the recorder. A constant-force spring biases the lever arms to a raised position.

40 Claims, 9 Drawing Figures

CARTRIDGE-LOADING APPARATUS FOR TAPE RECORDER DRIVES

BACKGROUND OF THE INVENTION

The present invention relates to tape recorders and more particularly to a cartridge or cassette-type tape transport for recorders which utilize magnetic tape cartridges, especially ANSI-type cartridge which contains quarter-inch wide magnetic tape.

Large-capacity magnetic tape cartridges or cassettes have fairly recently been developed for data processing and storage operations. Such cartridges include a supply and takeup reel and an elastomeric band riding over a plurality of idlers or rollers. A driven pinch wheel contained within the cartridge engages the band and the tape. The cartridge permits bi-directional and/or intermittent operation through a single driven member engaging the pinch wheel. Such a cartridge and available drive systems simplify the use of magnetic tape in the recording system. Problems and delays heretofore associated with mounting of separate reels and threading the tape through the transport and record/playback stations are eliminated. The design of the recorder may be simplified. However, problems have been experienced with the proper loading, locating and locking of such cartridges in the data recorders. Compensation for irregularities in the cartridge internal drive system may not be obtained.

An example of a cartridge-loading tape recorder adapted for the quarter-inch tape ANSI-type cartridge may be found in commonly-owned U.S. application Ser. No. 861,942, entitled CARTRIDGE-LOADING TAPE RECORDER, filed on Dec. 19, 1977. The recorder disclosed therein includes three spaced point-locating bearing members which define a reference plane relative to a recording head. A motor and drive capstan are mounted on a sliding plate. The capstan is biased into engagement with the tape by a nonuniform force coil spring. Provision is made for pushing the cartridge forward slightly and up slightly to properly position and lock the cartridge against the bearing members. An over-center door mechanism engages the rear of the cartridge and biases the cartridge forwardly into position. The means for shifting the cartridge slightly up and forwardly includes a plurality of spring-biased locator arms activated upon closure of the door mechanism.

Another example of a recorder for tape cartridges may be found in U.S. Pat. No. 3,976,262, entitled MAGNETIC TAPE CARTRIDGE RECORDER HAVING RELEASABLE CARTRIDGE CATCH ARRANGEMENT AND NON-RESONANT TYPE DRIVE and issued on Oct. 24, 1976 to Kennedy. The recorder disclosed therein includes guides or tracks for receipt of a cartridge and a catch mechanism to lock the cartridge in position. A driven wheel in the cartridge is engaged by a drive wheel which in turn is coupled to a drive motor through a resilient connection. The drive wheel is supported on a resiliently-mounted bearing and a spring urges the bearing and drive wheel into engagement with the tape cartridge driven wheel. The drive motor is mounted in the recorder remote from the drive wheel and is coupled thereto through beveled wheels.

SUMMARY OF THE INVENTION

In accordance with the present invention, a unique cassette or cartridge tape recorder and loading mechanism therefor are provided having reduced complexity when compared with the prior devices and which possesses the desirable qualities of ease of assembly and ease of manufacture at a reduced cost while providing positive locating and locking of the cartridge in the recorder upon hand insertion. Essentially, a tape drive member and motor are secured to a slidably mounted plate. A spring means engages the plate and biases the plate towards a first, forward position. A lever arm means supported by the recorder defines a surface engaging the slidably supported plate. Upon the insertion of a cartridge into the recorder, the cartridge engages the drive member shifting the drive member and plate towards a second, rearward, operating position. Cooperation between the plate and lever arm means causes the lever arm means to pivot under the bias of a spring to a position engaging the underside of the cassette, positioning the cassette and locking the cassette in the recorder.

In the preferred embodiment, the lever arm means includes a plurality of separate levers each supporting a roller. Each lever is engaged by a constant force spring and the plate supporting the motor is biased to its forward position by a constant force spring. The springs are preferably constant force buckling column springs.

The recorder and loading mechanism in accordance with the present invention provides significant advantages over the heretofore-available structures. The number of mechanical parts and adjustments are significantly reduced, resulting in a reduction in cost of manufacture due to a reduction in labor requirements and the level of skill needed to assemble the recorder. The spaced requirements are significantly less than the space required for presently-existing drives and the force holding the cartridge in place can be calculated very accurately when compared with prior designs. Manufacturing can repeatably locate the cartridge more accurately and with less labor with this design in comparison to previous designs. Further, the need for an over-center door mechanism to position the cassette is eliminated. The drive and recorder in accordance with the present invention permits both vertical and horizontal positioning of the recorder simply by changing the spring engaging the plate supporting the drive motor.

DETAILED DESCRIPTION OF THE PREFERRED EMBODIMENT

Figure 1:
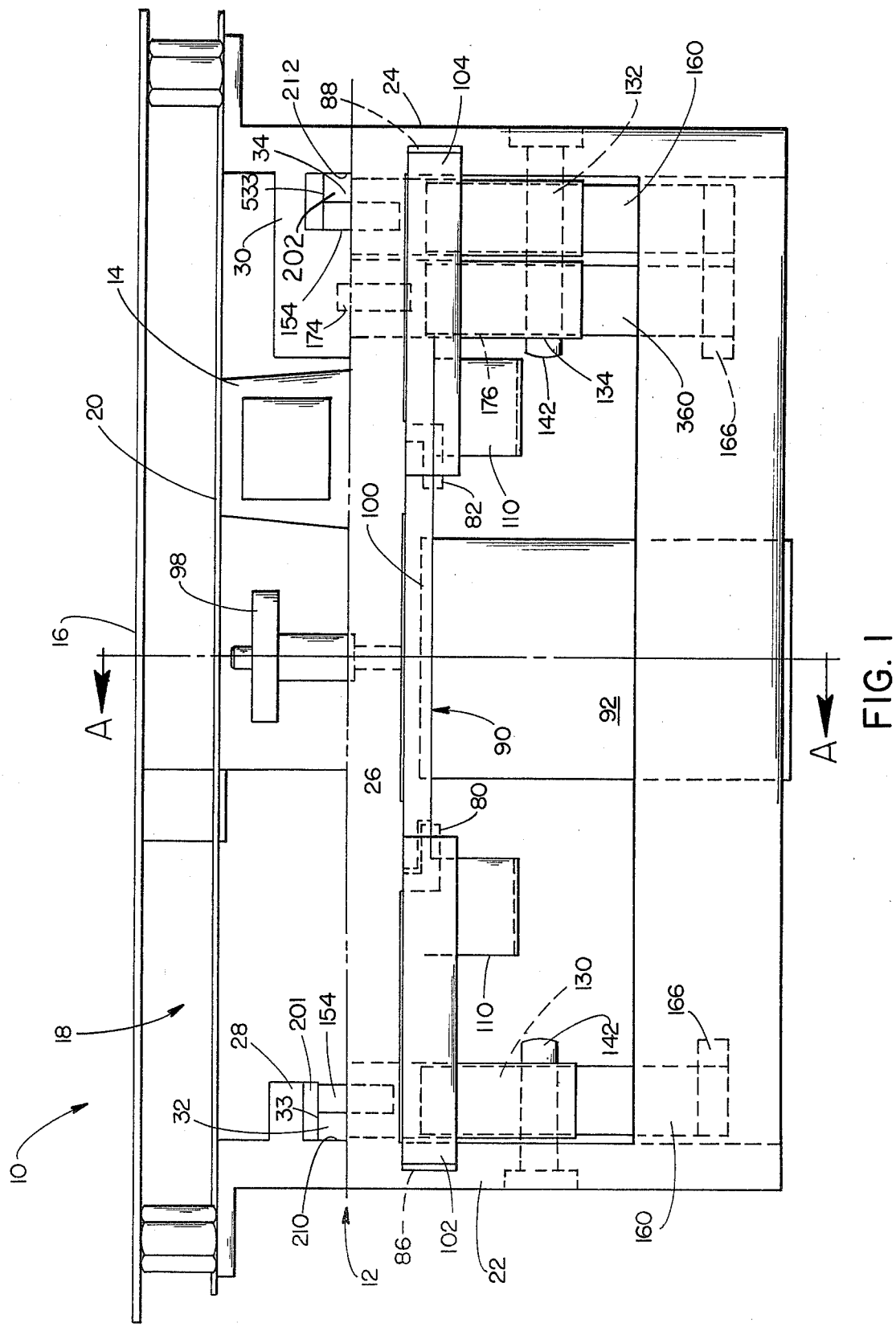
FIG. 1 is a front, elevational view of a cartridge recorder in accordance with the present invention.
Figure 2:
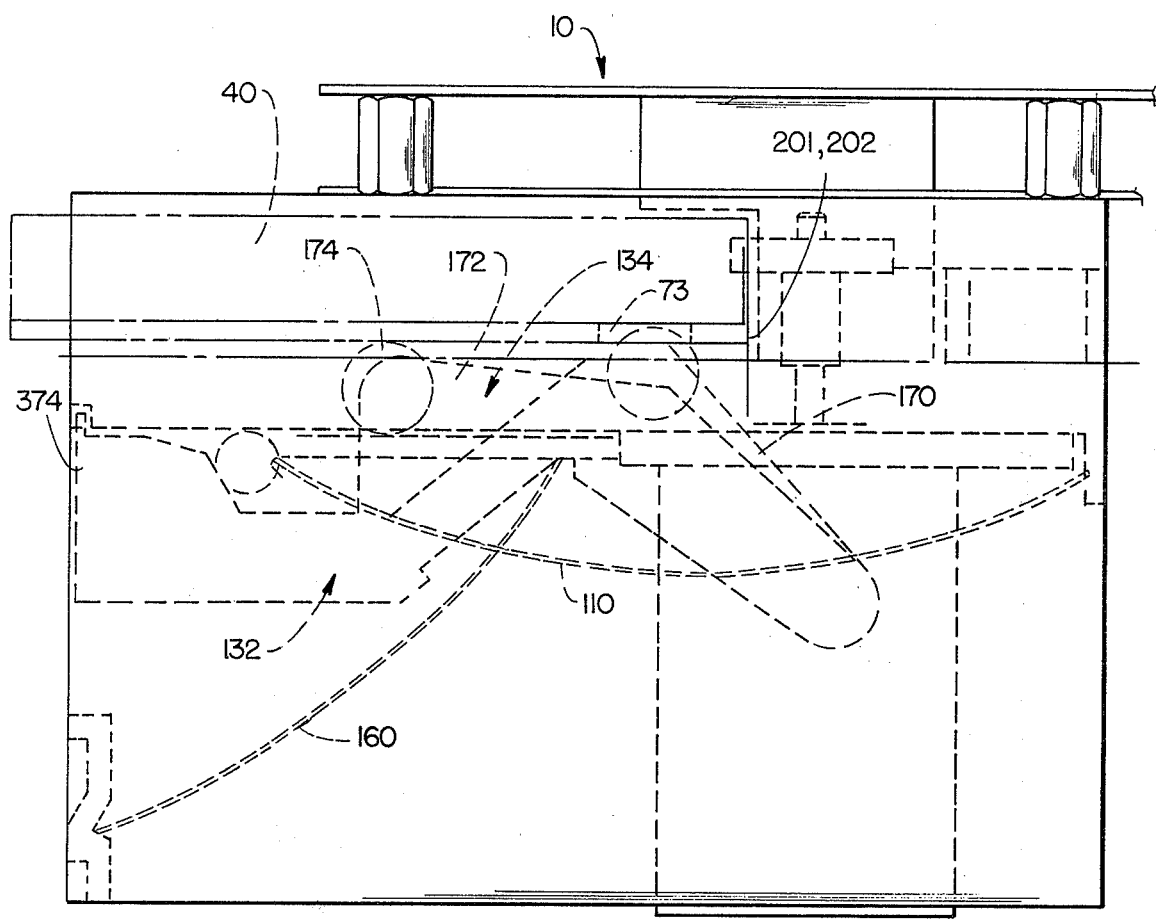
FIG. 2 is a right side, elevational view of the recorder.

The preferred embodiment of a recorder and cassette or cartridge loading apparatus in accordance with the present invention is illustrated in FIGS. 1 and 2 and generally designated 10. Recorder 10 includes a frame 12 which supports a read/write head 14, a printed circuit board 16, a switch and optical housing 18, and a shield structure 20. The frame 12 is generally H-shaped as seen in FIG. 1, having upright sidewalls 22, 24 and a central platform 26. The sidewalls 22, 24 define a pair of spaced, generally parallel, opposed and inwardly-directed tracks or rails 28, 30. The tracks or rails are defined by suitable grooves 32, 34 formed in the sidewalls 22, 24, respectively. Rails 28, 30 are adapted to support a tape cartridge generally designated 40 in FIGS. 3 and 4. Rails 28, 30 (as typified by rail 28 in FIG. 6) are tapered slightly towards the front of the recorder. A top edge 29 of rails 28, 30 is horizontal along its length. A lower edge 31 is angled upwardly from a horizontal portion 33. The thickness at portion 33 of each rail is less than the cartridge groove width described below. The tapered tracks or rails ease insertion of the cartridge and the horizontal portion 33 defines a reference plane for the cartridge.

Figures 3, 4, 5:
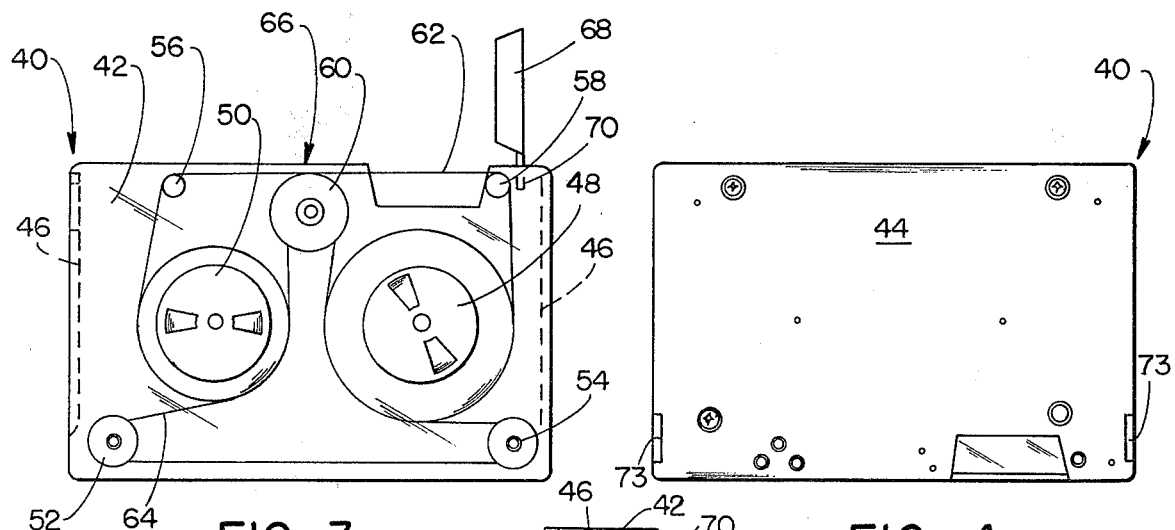
FIG. 3 is a top, plan view of a tape cartridge or cassette.
FIG. 4 is a bottom, plan view of a cartridge.
FIG. 5 is a fragmentary, cross-sectional view of one side edge of the tape cartridge.

Cartridge 40 is a commercially-available product and may be of the type marketed by Minnesota Mining and Manufacturing Company under the designation "Data Cartridge". Cartridge 40 includes a top wall 42, a bottom wall 44 and sidewalls 46 (FIGS. 3, 4 and 5). Supported within the cartridge are a supply reel 48, a takeup reel 50, idler rollers 52, 54, guide posts 56, 58 and a driven wheel or pinch roller 60. Magnetic tape 62 extends between the supply and takeup reels, around posts 56, 58 and in front of driven wheel 60. A portion of the driven wheel 60 is exposed at the front of the cartridge at an aperture 66. An endless, elastomeric band 64 extends around the driven wheel 60 and idler rollers 52, 54. The band 64 is in engagement with reels 48, 50. Upon rotation of driven wheel 60, band 64 engages the outer periphery of the tape on reels 48, 50 thereby driving the tape 62. Magnetic tape 62 is exposed at the front of the cartridge by a spring loaded, pivotal door 68.

As best seen in FIG. 5, top 42 and bottom 44 of cartridge 40 overlie the sidewalls 46 to define oppositely-positioned, elongated track-receiving grooves 70. The cartridge 40, therefore, is insertable into the recorder 10 with tracks 28, 30 riding in the track-receiving grooves 70 defined by the cartridge. When the cartridge 40 is so inserted, its bottom plate 44 is primarily guided into place by sidewall 210 and edges 31 and 231 on the left side, and by a comparable sidewall (212) and edges on the right side. Bottom plate 44 is limited and accurately located in a forward direction by an end wall 201 on the left and like end wall 202 on the right (FIGS. 2 and 6).

As seen in FIGS. 3 and 5, the door 68 of cartridge 40 includes a lateral extension 72 which in the normal closed position of the door is positioned across the front of the right-hand groove of the cartridge. Upon progressive insertion of the cartridge into the recorder, extension 72 is engaged by track 30 thereby pivoting the door 68 open to provide access to the tape 62 by the read/write head 14.

The undersurface on cartridge bottom wall 44 defines a pair of spaced, forwardly-located notches 73 therethrough (FIGS. 4 and 7, 8 and 9). Notches 73, as explained below, cooperate with a lever mechanism to position and lock the cartridge in the recorder.

Figure 6:
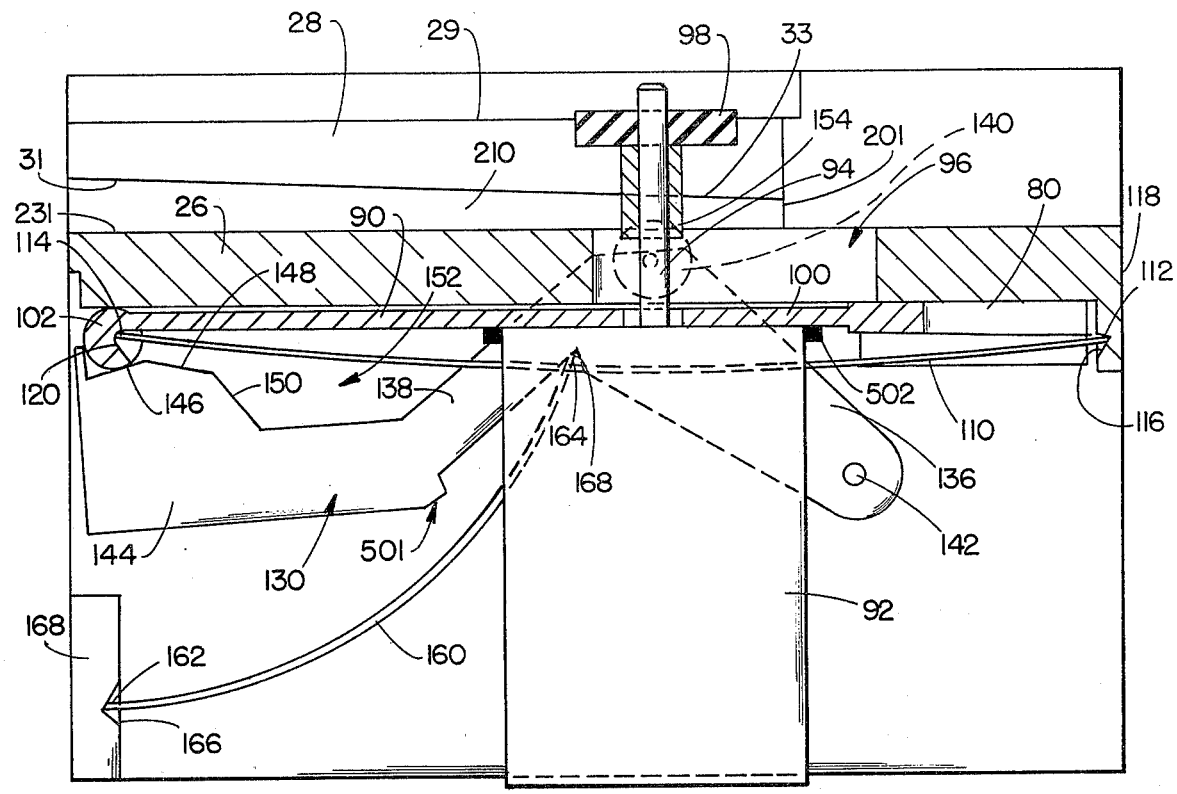
FIG. 6 is a cross-sectional view taken generally along line A—A of FIG. 1.

In accordance with the present invention and as best seen in FIGS. 1, 2 and 6, provision is made for loading, locating, positioning and locking cartridge 40 within the recorder and for drivingly engaging driven wheel 60 of the cartridge. As seen in FIGS. 1 and 6, frame 12 defines opposed, inwardly-directed tracks 80, 82, and sidewalls 22, 24 define grooves 86, 88, all of which cooperate to support a drive motor. Positioned slidably within grooves 86, 88 and within tracks 80, 82 is a motor mount plate or slide 90. Secured to the rearward portion of slide 90 and generally along the longitudinal centerline thereof is a drive motor 92. Drive motor 92 includes an output shaft 94 extending through an enlarged aperture 96 formed in platform 26. Supported on output shaft 94 and driven thereby is a drive roller or drive member 98. Motor 92 is secured to a main portion 100 of slide or plate 90. Extending transversely and outwardly along the forward edge of plate 90 are a pair of opposed, cylindrical members 102, 104. The outer ends of members 102, 104 ride within the grooves 86, 88, respectively, formed in the sidewalls 22, 24 of the rigid frame 12. Slide or plate 90, therefore, supports drive motor 92 in a movable manner, i.e., from a first position shown in FIG. 6 to a second, home or operative position shown in FIG. 9. This is described in detail below.

Slide 90 is resiliently biased to its forwardmost position by slide springs 110 (FIGS. 1, 6). Springs 110 are flat, generally rectangular, elongated members having ends 112, 114. End 112 is captured (entrapped) within a generally V-shaped notch or pocket 116 formed in a downward extension or rear wall portion 118 of frame 12. Forward end 114 of spring 110 is captured and entrapped within a similarly configured notch or pocket 120 at each of the cylindrical members 102, 104. As explained in detail below, springs 110 are buckling column constant-force springs which are bowed and thus resist movement of slide 90 from its forwardmost position to its rearwardmost position. The constant force generated by springs 110 may be accurately calculated. This provides significant advantages which will readily become apparent.

Notches 116, 120 provide a convenient and efficient manner of locating and holding the springs 110 in place. These notches are relatively inexpensively molded or otherwise formed in the frame structure 12. They cause little drag on the springs 110 and do not wear significantly. Lubrication is unnecessary and wear problems are alleviated. The springs 110 are easily installed by hand without the need for special tools or skill. The configuration of the notches, which can be described as generally V-shaped and angled downwardly, holds the springs securely, accurately and prevents the springs from being bowed the wrong way during assembly.

As the cartridge is inserted into the open front of the recorder along rails 28, 30, driven wheel 60 of the cartridge will engage motor drive wheel 98 supported with the motor 92 on slide 90. Pushing the cartridge into the recorder along the rails causes the slide 90 to shift rearwardly against the constant-force bias of springs 110. Upon rearward movement of slide 90, provision is made for locating and locking the cartridge or positively holding the cartridge against the rails within the recorder in an operative position. This is accomplished by a lever arm means including locator arms 130, 132 and a rear locator arm 134 (FIGS. 1, 2 and 6). Arms 130, 132 are identical and are positioned in opposed, spaced relationship at sidewalls 22, 24, respectively. As best seen in FIG. 6, each arm 130, 132 has a generally V-shaped portion including a leg 136 and a leg 138 joining to define an apex 140. Each leg 136 is mounted to frame 12 by a pivot pin 142 extending through the respective sidewall 22 or 24. Extending forwardly from leg 138 is a camming portion 144. Camming portion 144 includes a first, negatively-angled cam surface portion 146, a positively-angled, downwardly-directed cam surface portion 148 and a third non-camming surface portion 150 angled downwardly and defining with leg 138 a notch 152. The camming surface defined by portions 146 and 148 engages and cooperates with the outer peripheral surface of the extensions 102, 104 of the motor mount slide to automatically position and shift the locator arms or lever arms 130, 132 upon insertion of a cartridge into the recorder.

Rotatably supported on each arm 130, 132 at apex 140 is a wheel-like roller 154. Rollers 154, as seen in FIG. 1, generally underlie the tracks or rails 28, 30 upon which the cartridge 40 is disposed. Platform 26 is formed with suitable slots or apertures through which the rollers may extend.

Figure 7:
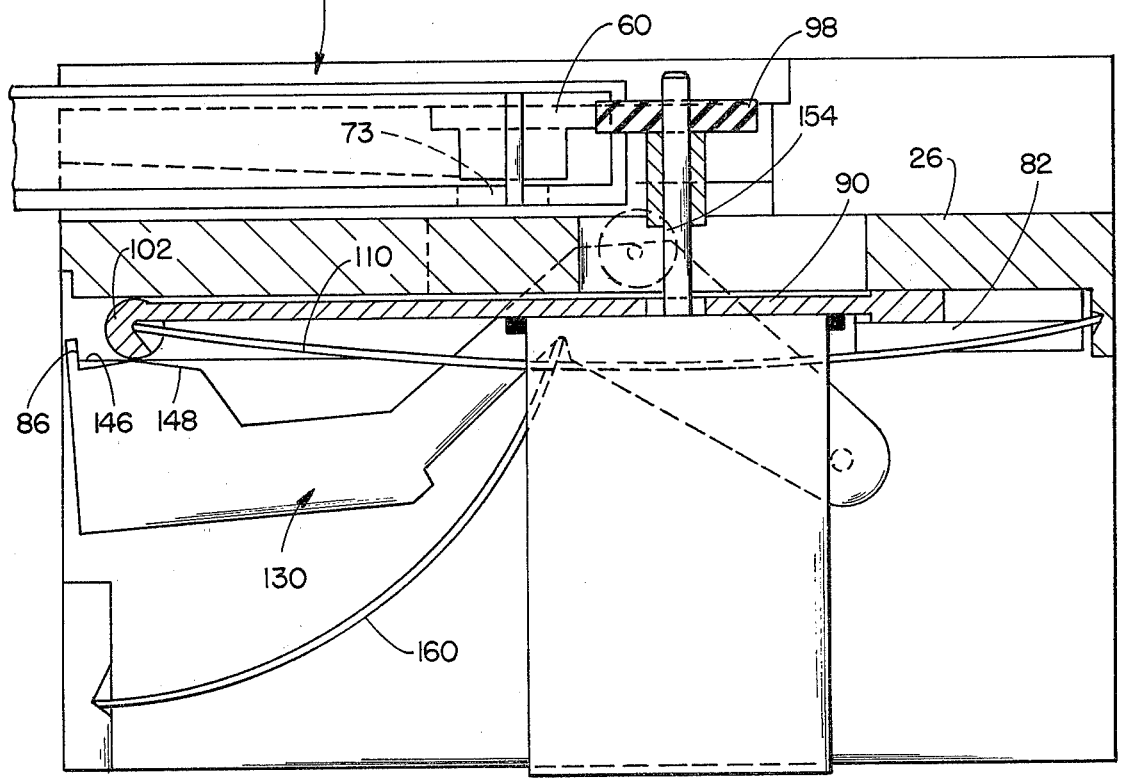
FIGS. 7, 8 and 9 are cross-sectional views taken generally along line A—A of FIG. 1 and showing the operation of the mechanism as the cartridge is slid into the recorder and pushed to the home position.

Each lever arm 130, 132 is biased towards an operative position, i.e., for pivotal movement in a clockwise direction when viewed in FIGS. 2, 6 and 7, by a constant-force spring 160. Constant-force springs 160 each include a forward end 162 and a rearward end 164. Ends 162 are received within notches or pockets 166, which are generally V-shaped, open in a generally upward direction, are formed in a lower front wall portion 168 of frame 12, and serve to entrap and capture the forward end of springs 160. The rearward ends 164 of each spring 160 are entrapped in V-shaped notches 168 defined by legs 138, 136 of the respective levers 130, 132. This method of entrapment, as set forth above with respect to springs 110, provides ease of assembly and removal of the springs without the need for special tools or special skills.

Rear locator arm 134 is configured similarly to arms 130, 132 and as seen in FIG. 2 (FIGS. 1 and 2), includes a leg portion 170 (FIG. 2) pivoted to sidewall 24 of frame 12 at pivot pin 142. Portion 170 is joined to an elongated leg portion 172 which at its forward end supports a roller 174. Arm 134 is biased to an operative position by another constant-force spring 360 (FIG. 1). The spring 360 which engages arm 134 is mounted like its counterpart spring 160, having an end 162 received within frame notch 166 and an opposite end 164 received within a suitable notch formed in the arm lever similar to notch 168 of arm 130. Platform 26 (FIG. 1) defines a suitable aperture or slot through which roller 174 may extend. The clockwise rotation of arm 134 is limited by its apex end 374 (FIG. 2), which contacts the bottom side of platform 26 when the cartridge is not present. The arm 134 is rotated counterclockwise during the process of inserting the cartridge, the leading edge cartridge bottom plate 44 causing the roller 174 to move downwardly.

In the preferred embodiment, each of the springs 110, 160, 360 is fabricated from an elongated, generally rectangular, thin steel strip. These springs operate in the manner of slender or thin-walled columns, exhibiting an elastic buckling behavior whereby they exert a constant force within a range of bowing deflections. With such a spring, elastic deflection or bowing is not proportional to load. In other words, these members have a zero spring rate and exhibit constant force characteristics. These springs act in accordance with Euler's formula for elastic buckling loads. Euler's formula is as follows:

$$P = \frac{\pi^2 EI}{L^2},$$

where
E = Stiffness of the material
I = Moment of inertia of the cross section of the spring about its neutral axis
L = Spring length This formula provides the buckling load for the spring.

The forces acting on motor-mount slide 90 and on the respective lever arms 130, 132 and 134 may therefore be accurately calculated. This results in a high level of confidence in the holding or locking of the cartridge within the recorder when compared to prior structures. The springs are extremely simple to manufacture. Strip steel in the correct width and thickness as determined by application of the aforementioned formula need merely be cut to length at the recorder manufacturer's facility. The compressed length of the constant force buckling column springs is basically tolerance-insensitive because the force is constant regardless of compressed length of the spring within the design limits. Manufacture of the mating parts of the recorder is therefore less costly since the tolerances need not be maintained as tightly. This is not true of prior structures which employ coil springs or extension springs whose force is proportional to their extension. Springs 110 permit the accurate attainment of the optimum force between driven member 60 of the cartridge and driven member 98 of the recorder drive system. Also, springs 110 store the maximum amount of energy for the allowed travel of motor slide 90 without exceeding the maximum force that the motor drive roller 98 should exert against the cartridge drive roller 60.

OPERATION

Figure 8:
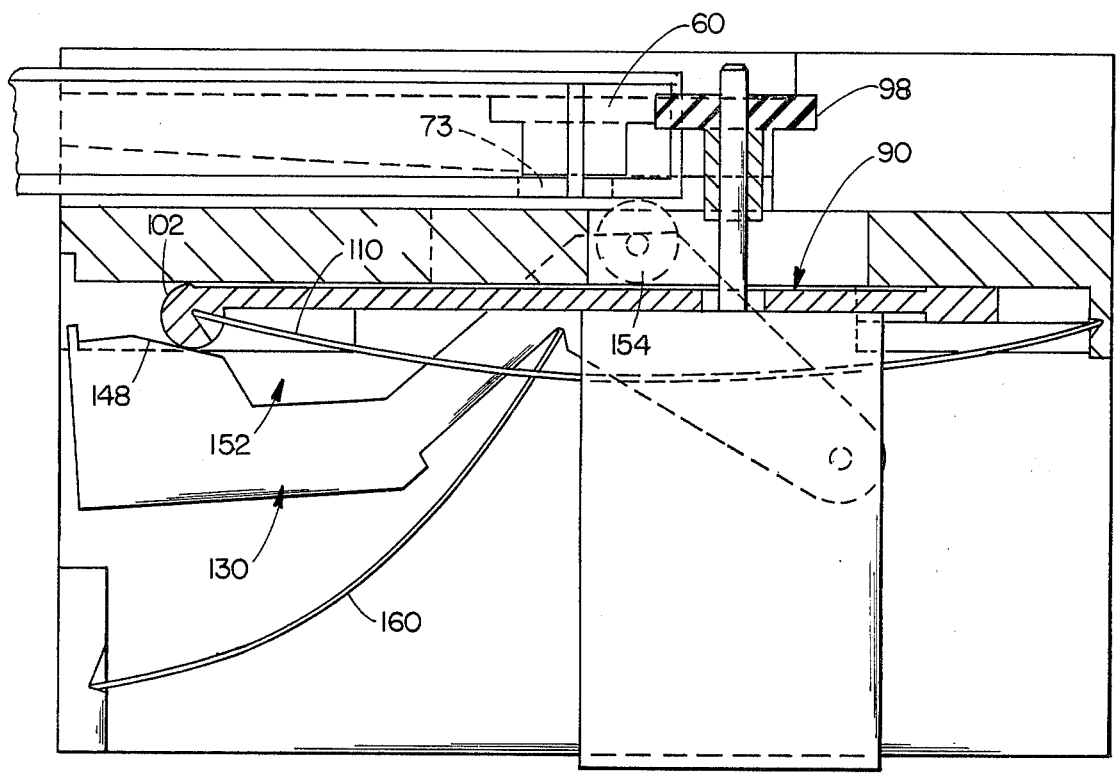
Figure 9:
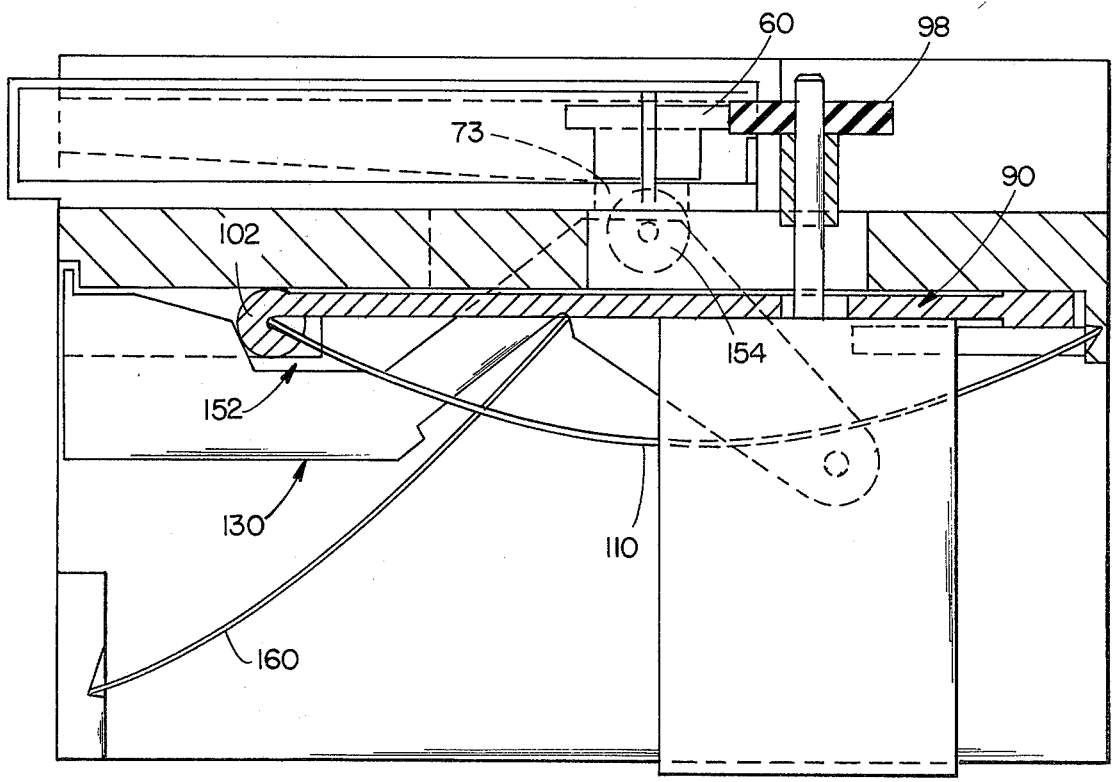

The operation of the cartridge-loading apparatus in accordance with the present invention should be readily apparent from the foregoing, and as shown in FIGS. 7, 8 and 9. FIG. 7 shows cartridge 40 at the first stages of insertion into the recorder, guided by surfaces 31, 231 and 210. Driven wheel 60 of the cartridge has engaged the motor drive wheel 98 and slide 90 has begun moving from its forwardmost position rearwardly towards the operative position (i.e., to the right as seen in FIG. 7). The surface defined by cylindrical camming members 102, 104 has ridden up ramp portions (camming surface portions) 146 or arms 130 and 132. This initial movement causes these arms to move downwardly in a counterclockwise direction to a lowermost position moving the roller 154 on each arm downward to a point near the upper surface of platform 26. This allows the leading edge of the cartridge or cassette 40 to move past and over the centerline of the rollers before the rollers are driven upwardly and forwardly against the bottom of the cartridge.

As best seen in FIG. 8, as the cartridge is pushed forwardly into the recorder, motor slide plate members 102, 104 now engage the downwardly-angled or positively-angled surfaces 148 on the lever arms. The downwardly-angled cam surface portions 148 permit the lever arms to pivot in a clockwise direction under the bias of springs 160, thereby shifting the rollers 154 upwardly and into initial engagement with the undersurface of the cartridge. When the slide 90 is in the position shown in FIG. 8, rollers 154 are just beginning to apply a force against the bottom side of the cartridge.

As the cartridge 40 is pushed further into the recorder as shown in FIG. 9, the cam surfaces will move out of engagement with the motor slide extensions 102, 104 and these extensions become disposed within notches 152 defined in the lever arms. As a result, each of the lever arms may pivot back toward their original positions under the bias of lever springs 160. The cartridge may thus be pushed forwardly until the rollers 154 on lever arms 130, 132 are received within the forward notches 73 defined by the bottom surface 44 of the cartridge. After the rollers 154 enter notches 73, the cartridge is then pushed forwardly and upwardly by rollers 154, under the bias of springs 160, into locking engagement with the rails 28, 30. In this operation, the springs 160 store the maximum amount of energy for the allowed rotation of the arms 130 and yet allow the motor slide springs 110 to overcome springs 160 through the reaction of the camming action of motor slide portions 102, 104 and cam surfaces 148 when the cartridge is removed. This stored energy in springs 160 is used to insure that the cartridge is pulled into its final home position with or without the help of an operator. It is important that the cartridge be pulled in automatically so that it seats in indexed position before recording is enabled; to avoid any human error. The cartridge is held and locked in its indexed, home position by the rollers 154. Roller 174 engages the cartridge adjacent the rear portion thereof to raise the rear end of the cartridge into the proper reference with respect to the drive wheel 98 and the read/write head 14 of the recorder.

The motor slide 90, the lever arms and the springs are dimensioned so that a predetermined force is exerted on the cartridge driven wheel 60 by the motor drive wheel 98. These parts and the springs are easily configured to achieve the optimum force (specifically, 24 ounces for the particular cartridge identified above) and to accommodate any irregularities in the cartridge. The final positioning of the cartridge 40 in the home position is clearly seen in FIG. 2. The loading and tape drive mechanism of the present apparatus thus firmly locates and locks the cartridge in the proper position.

When the operator desires to remove the cartridge, the rear of the cartridge is grasped by hand and pulled rearwardly. Upon rearward movement of the cartridge, the cartridge forces (i.e., cams) arms 130 and 132 counterclockwise by forcing rollers 154 downward and forward until the cams 102, 104 engage the cam surface 148. Thereafter, the slide plate 90, by its cams 102, 104, rotates the levers 130 and 132 downwardly or in a counterclockwise direction as viewed in FIG. 2, since the springs 110 drive the extensions 102, 104 over the cam surfaces on the levers. The reverse cam angle assumed by portions 146 of the cam surfaces holds the slide 90 in the forward position and latches the levers 130 and 132 in their down, or first, non-operating position. This is seen in FIG. 6.

The loading mechanism and tape drive in accordance with the present invention has significantly fewer mechanical parts and therefore increase reliability from prior structures. The labor, cost to manufacture and skill needed to assemble the drive are significantly less than that heretofore involved. An over-center door mechanism such as was used heretofore is no longer required to bias and locate the cartridge relative to the drive motor and the read/write head. This not only eliminates expense but also simplifies the operation of the recorder. The frame may be easily manufactured as a molded item from a thermoset plastic or a glass-reinforced engineering thermoplastic. Motor slide 90 is readily manufactured employing conventional techniques preferably by fabrication from a low-friction engineering plastic. Glass-reinforced teflon-filled polyacetal is such a material. The constant-force springs which function as elastic buckling columns are easily manufactured with accurate calculation of the forces holding the cartridge in position. The parameters which control the spring force such as thickness, width and length of the spring can be easily maintained very accurately at a relatively low cost in comparison to other types of springs. The springs reduce the criticality of tolerances in the manufacture of the mating parts since the compressed (buckled) length of the spring is basically tolerance-insensitive. The vector analysis necessary to properly configure and design the recorder is simpler and more predictable. The zero spring-rate factor of the springs eliminates one design variable. The constant-force springs provide more force to cam the levers downwardly upon removal of the cartridge than would be obtainable from an extension spring when the maximum force of the spring is predetermined by other design requirements. An extension spring would provide a decrease in force as the motor slide moves forwardly, since the force of such a spring is proportional to length. The recorder is readily adapted to vertical operation merely by selection of springs 110 which will provide the requisite amount of force. In such an embodiment, compensation for the weight of the motor and slide is easily obtained; the selected springs would have a constant force greater than the set of springs provided for horizontal positioning, equal to the weight of the motor plus the motor slide. Such springs are easily and readily installed without the use of special tools or special skills. The pocket entrapment feature defined by the grooves 116, 120, 164 and 166 eliminates the need for lubrication and eliminates wear problems. The apex 501 and 502 and the pockets prevent the springs from being bowed in the wrong direction when assembled. This further simplifies manufacture and assembly. The springs are symmetrical, making installation very simple. The springs are held securely and accurately and the notches are a molded-in feature in the molded frame and molded arm. These molded-in notches do not increase the cost of the molded parts.

In view of the foregoing description, it should now be readily apparent to those of ordinary skill in the art that the unique recorder and cartridge or cassette-loading apparatus in accordance with the present invention provides heretofore-unobtained advantages and represents a significant advance in the art. The cartridge is easily loaded or unloaded by hand, thereby being moved into operative driving engagement with the tape drive elements and the transducing head. Due to the composite upward and forward movement of the rollers 154 and 174, the cartridge is firmly held against surfaces 33, 533, 201 and 202 and against surfaces 210, and is properly located and referenced with respect to drive member 98 and with respect to both the read/write head 14 and cartridge sensor housing 18. Undoubtedly, various modifications will now become apparent to those of ordinary skill in the art which would not depart from the inventive concepts disclosed herein. For example, the specific configuration of the slide plate 90 and the lever arms could be varied while still obtaining the desired coaction and positioning of the rollers with respect to the cartridge. Also, the positioning of the entrapment notches for the springs and the spring dimensioning and location could be varied while obtaining the desired biasing action. Further, a simple closure door (not shown) may be supported at the front of the recorder to close the opening within which the cartridge is disposed during operation of the recorder. Suitable switches (not shown) may be supported at housing 18 and engaged by the cartridge upon full insertion thereof, when the cartridge is in its home position. Such switches may be used, in a known manner, to activate the controls which cause drive motor 92 to rotate drive wheel 98. It is therefore expressly intended that the above description should be considered as only that of the preferred embodiment. The true spirit and scope of the present invention may be determined by reference to the appended claims.

The embodiments of the invention in which an exclusive property or privilege is claimed are defined as follows:

1. A cartridge tape recorder of the type including a frame, a recording head supported by the frame, a motor and a tape drive member rotated by said motor, and loading means for holding a cartridge in the recorder in operable engagement with the tape drive member upon insertion of the cartridge into the recorder, said loading means comprising:
   a carriage slidably supported on said frame for movement from a first, forward position to a second, rearward, operating position upon insertion of the cartridge, said tape drive member being mounted on said carriage;
   first spring means on said frame and engaging said carriage for biasing said carriage toward its first position;
   lever arm means pivoted to the frame, said arm means being movable from a first position to a second operating position for engaging a cartridge inserted into the recorder, positioning the cartridge and locking the cartridge in the recorder in operable engagement with the tape drive member and the recording head;
   a second spring means at least partially supported on said frame and engaging said lever arm means for biasing said lever arm means from said first position to said second position; and
   camming means acting between said lever arm means and said carriage for enabling movement of said lever arm means from said first position to said second position upon insertion of the cartridge as said cartridge engages the drive member causing the carriage to move from its first position to its second position.

2. A cartridge tape recorder as defined by claim 1 wherein said first and second spring means exert a constant force on the carriage and the lever arm means, respectively, as the carriage and lever arm means move from their first to their second positions.

3. A cartridge tape recorder as defined by claim 2 wherein said first spring means comprises an elongated member extending between said frame and said carriage, said frame defining a notch for receiving one end of said member and said carriage defining another notch for receipt of the other end of the member.

4. A cartridge tape recorder as defined by claim 3 wherein said first spring means is a constant-force buckling column spring.

5. A cartridge tape recorder as defined by claim 2 wherein said second spring means is an elongated member extending between said frame and said lever arm means, said frame defining a notch for receipt of one end of said elongated member.

6. A cartridge tape recorder as defined by claim 5 wherein said second spring means is a constant-force buckling column spring.

7. A cartridge tape recorder as defined by claim 1 wherein said lever arm means comprises:
   a first lever arm having an end pivoted to the frame; and
   a first roller supported on said first lever arm in a position to engage a forward portion of the cartridge upon insertion of the cartridge into the recorder and wherein said spring means comprises:
   a first constant-force buckling column spring having an end held by the frame and another end engaging the first lever arm.

8. A cartridge tape recorder as defined by claim 7 wherein said lever arm means further comprises:
   a second lever arm having an end pivoted to the frame at a point transversely spaced from said first lever arm;
   a second roller supported on said second lever arm in a position to engage the forward portion of the cartridge upon insertion of the cartridge into the recorder and wherein said second spring means further comprises:
   a second constant-force buckling column spring having an end held by the frame and another end engaging the second lever arm to bias the second lever arm with a constant force throughout its movement from its first to its second position.

9. A cartridge tape recorder as defined by claim 8 wherein said lever arm means further comprises:
   a third lever arm having an end pivoted to the frame at a point transversely spaced from said first and second lever arms;
   a third roller supported on said third lever arm in a position to engage the undersurface of said cartridge along a portion spaced rearwardly of said cartridge from said forward portion; and
   a third constant-force buckling column spring having an end held by the frame and another end engaging the third lever arm.

10. A cartridge tape recorded as defined by claim 9 wherein said frame defines first, second and third pockets for entrapping an end of the first, second and third springs, respectively, to thereby hold said springs.

11. A cartridge tape recorder as defined by claim 1 wherein said camming means comprises a cam surface carried on said lever arm means and engaging the carriage, said cam surface configured to lower the lever arm means upon initial forward movement of the carriage and to then permit the lever arm means to raise upwardly upon further forward movement of the carriage, said lever arm means configured to move substantially out of movement-causing engagement with said carriage upon further forward movement of said carriage to said second position.

12. A cartridge tape recorder as defined by claim 11 wherein said carriage includes a transversely-extending, generally cylindrical portion, said cam surface of said lever arm means engaging said generally cylindrical portion.

13. A cartridge tape recorder as defined by claim 9 wherein said camming means comprises each of said lever arms defining a cam surface along a portion of their lengths which surfaces engage the carriage during a portion of carriage movement between the carriage's first and second positions.

14. A cartridge tape recorder as defined by claim 13 wherein said carriage defines generally cylindrical surfaces engaging the cam surfaces of both said levers.

15. A cartridge tape recorder as defined in claim 14 wherein said cam surfaces have like configurations and are configured to hold the carriage in its first position and then lower the rollers upon initial insertion of a cartridge, raise the rollers into engagement with the cartridge and then move out of engagement with the carriage so that each lever moves freely under the bias of its respective spring to position and lock the cartridge in position.

16. A cartridge tape recorder as defined in claim 15 wherein said frame defines a pair of transversely-spaced, parallel tracks above said carriage for receipt of the cartridge, said rollers on said lever arms pushing said cartridge against said tracks and forwardly along said tracks.

17. A tape drive apparatus for a cartridge of the type including a driven wheel exposed at the front thereof, said drive apparatus including a frame having means for slidably supporting a motor mount plate and a motor secured to said motor mount plate and coupled to rotate a drive member engageable with the driven wheel of the cartridge, said tape drive apparatus further comprising:
 a constant-force spring operatively engaging the frame and the motor mount plate for resiliently biasing the motor mount plate to a first position, said motor mount plate being slidable from the first position to a second position upon loading of a cartridge; and
 cartridge positioning and locking means supported on said frame and cooperating with said motor mount plate for locking the cartridge in operative position in engagement with the driven member upon movement of said motor mount plate from the first position to the second position, said motor mount plate sliding to said second position upon pushing engagement of the cartridge driven wheel with said drive member, said cartridge positioning and locking means including means for receiving said cartridge and defining a reference plane.

18. A tape drive apparatus for a cartridge of the type including a driven wheel exposed at the front thereof, said drive apparatus including a frame movably supporting a motor mount and a motor secured to said mount and coupled to rotate a drive member engageable with the driven wheel of the cartridge, said tape drive apparatus further comprising:
 a constant-force spring operatively engaging the frame and the motor mount for resiliently biasing the motor mount to a first position, said motor mount being slidable from the first position to a second position upon loading of a cartridge; and
 cartridge positioning and locking means supported on said frame and cooperating with said motor mount for locking the cartridge in operative position in engagement with the driven member upon movement of said motor mount from the first position to the second position, said motor mount moving to said second position upon pushing engagement of the cartridge driven wheel with said drive member, and wherein said cartridge positioning and locking means includes:
 a pair of opposed, spaced guide rails for receipt of the cartridge, said rails defining a reference plane.

19. A tape drive apparatus as defined by claim 18 wherein said cartridge positioning and locking means further comprises:
 a lever arm having a free end defining a camming surface and an end pivoted to the frame for movement towards and away from one of said rails, said camming surface dimensioned to engage said motor mount along a portion of the travel of said motor mount between its first and second positions, said motor mount defining a cam surface engaging said camming surface; and
 a constant-force lever spring engaging said frame and engaging said lever arm, for resiliently biasing said arm from a first stored position towards said reference plane to a second home position at which the cartridge is indexed in position, and biased against, said guide rails.

20. A tape drive apparatus as defined by claim 18 wherein said guide rails each include a forwardly-tapered portion defined by an elongated upper edge and an angled lower edge, said lower edge including an elongated portion defining a reference plane.

21. A tape drive apparatus as defined by claim 19 wherein said cartridge positioning and locking means further comprises:
 a roller carried by said lever arm and movable by said arm upwardly and forwardly into engagement with the cartridge as the latter moves along said rails toward its indexed position.

22. A tape drive apparatus as defined by claim 21 wherein said a constant-force spring is a slide spring, said slide spring and said lever spring are constant-force elastic buckling column springs.

23. A tape drive apparatus as defined by claim 22 wherein said lever arm camming surface includes a reverse angled portion which engages the motor mount cam surface when in the first position to hold the motor mount in its forward position and the lever arm in its first position.

24. A tape drive apparatus as defined by claim 22 wherein said lever arm camming surface is configured so that the lever arm is initially pivoted away from said reference plane to permit the cartridge to pass by said roller.

25. A tape drive apparatus as defined by claim 24 wherein said lever arm camming surface is further configured to limit movement of said lever towards said reference plane until said motor mount approaches its second position, said lever arm moving freely under the bias of said lever spring when said motor mount is in said second position so that the roller engages the cartridge and holds the cartridge against the rails.

26. A tape drive apparatus as defined by claim 25 wherein said slide spring and said lever spring are elongated, rectangular, generally flat members, said frame defining pockets for receipt of the ends of said flat members.

27. A tape drive apparatus as defined by claim 26 wherein said lever arm camming surface includes a reverse angled portion which engages the motor mount cam surface when in the first position to hold the motor mount in its forward position.

28. A tape drive apparatus as defined by claim 18 wherein said cartridge positioning and locking means comprises:
- a plurality of arms, each pivoted at one end to the frame and movable towards and away from the reference plane defined by said guide rails; and
- a plurality of constant-force lever springs, each lever spring engaging one of said arms, said lever springs biasing said arms towards the reference plane defined by said guide rails, said motor mount dimensioned to engage said arms when said motor mount is in its first position.

29. A tape drive apparatus as defined by claim 28 wherein said cartridge positioning and locking means further comprises:
- a plurality of rollers, one roller mounted on each of said arms, and wherein one of said rollers is positioned to engage and position a rear portion of the cartridge when the motor mount is in its second position.

30. A tape drive apparatus as defined by claim 29 wherein said motor mount includes a portion defining a cam surface and each of said arms includes a portion defining a camming surface engageable with said motor mount cam surface during a portion of the movement of the motor mount from its first to its second position, to control movement of said arms towards and into engagement with the cartridge and to cause said arms to move away from the reference plane upon removal of the cartridge from the rails, said motor mount shifting to its first position under the bias of said slide spring and said arms moving against the bias of said lever springs.

31. A tape drive apparatus as defined by claim 30 wherein said slide spring and said lever springs are elongated generally flat strips, each strip having an end entrapped with a generally V-shaped pocket carried on the frame.

32. A tape drive apparatus as defined by claim 31 wherein said frame defines opposed sidewalls and a platform extending between said sidewalls.

33. A tape drive apparatus as defined by claim 32 wherein said platform defines a track, said motor mount slidably held to the platform by the track.

34. A tape drive apparatus as defined by claim 33 wherein at least one of said frame sidewalls defines a groove, said motor mount portion defining said cam surface extending into said groove.

35. A tape drive apparatus as defined by claim 34 wherein said guide rails each include a forwardly-tapered portion defined by an elongated upper edge and an angled lower edge, said lower edge including an elongated portion defining a reference plane.

36. Cartridge loading and positioning apparatus adapted for use in a recorder, said apparatus being of the type including a frame having opposed guides for receiving a hand-inserted cartridge, said apparatus further comprising:
- a movable positioning member, and means on said frame for mounting said member for movement from a first position to a second position upon insertion of the cartridge;
- resilient means engaging said member for resiliently biasing said member toward its first position; and
- cartridge locking means engaging said positioning member during at least a portion of the movement of said member between said first and second positions, for locking the cartridge in an operative position on said guides upon movement of said positioning member from its said first position to its said second position, and wherein said resilient means comprises a constant-force spring.

37. Cartridge loading apparatus as defined by claim 36 wherein said cartridge locking means comprises:
- an arm having an end supported on the frame and another end defining a cam surface, said movable positioning member defining a camming surface which engages said arm cam surface; and
- second resilient means engaging said arm for biasing said arm for movement from a first position to a second locking position at which said arm operatively engages said cartridge as said positioning member moves from its first position to its second position against the bias of the first said resilient means.

38. Cartridge loading apparatus as defined by claim 37 wherein said cartridge locking means arm includes a roller mounted in a position to engage the cartridge when said arm is in its second position.

39. Cartridge loading apparatus as defined by claim 38 wherein said roller is positioned to be initially contacted by the cartridge along a minor chord of the roller as the cartridge commences insertion into the apparatus.

40. Cartridge loading apparatus as defined by claim 38 wherein said resilient means and said second resilient means each comprise:
- a constant-force buckling column spring.

* * * * *